(12) United States Patent
Zaitsev et al.

(10) Patent No.: US 11,242,753 B2
(45) Date of Patent: Feb. 8, 2022

(54) MOTION CONVERSION MECHANISM

(71) Applicant: Andrei Alexeevich Zaitsev, Moscow (RU)

(72) Inventors: Andrei Alexeevich Zaitsev, Moscow (RU); Alexandr Ivanovich Golovkov, Moscow (RU)

(*) Notice: Subject to any disclaimer, the term of this patent is extended or adjusted under 35 U.S.C. 154(b) by 0 days.

(21) Appl. No.: 16/965,636

(22) PCT Filed: Apr. 10, 2019

(86) PCT No.: PCT/RU2019/000235
§ 371 (c)(1),
(2) Date: Jul. 29, 2020

(87) PCT Pub. No.: WO2019/160452
PCT Pub. Date: Aug. 22, 2019

(65) Prior Publication Data
US 2021/0040853 A1 Feb. 11, 2021

(30) Foreign Application Priority Data
Feb. 15, 2018 (RU) .......................... RU2018105758

(51) Int. Cl.
| | |
|---|---|
| *F01C 1/344* | (2006.01) |
| *F01C 17/02* | (2006.01) |
| *F02B 55/14* | (2006.01) |
| *F16H 48/10* | (2012.01) |
| *F16H 25/04* | (2006.01) |

(52) U.S. Cl.
CPC .............. *F01C 1/344* (2013.01); *F01C 17/02* (2013.01); *F02B 55/14* (2013.01); *F16H 25/04* (2013.01); *F16H 48/10* (2013.01)

(58) Field of Classification Search
CPC .......... F01C 1/344; F01C 17/02; F16H 25/04; F16H 48/10; F02B 55/14
See application file for complete search history.

(56) References Cited

U.S. PATENT DOCUMENTS

| | | | |
|---|---|---|---|
| 6,383,110 B1* | 5/2002 | Bursal ..................... | F16H 25/06 475/196 |
| 7,506,668 B2* | 3/2009 | Vanderjeugt ............. | D03C 1/00 139/58 |
| 2011/0259295 A1* | 10/2011 | Mihailescu ............. | F02B 53/00 123/200 |
| 2016/0298536 A1* | 10/2016 | Lukaczyk ............... | F01C 17/06 |

* cited by examiner

*Primary Examiner* — Audrey B. Walter
(74) *Attorney, Agent, or Firm* — Nixon & Vanderhye PC

(57) ABSTRACT

Devices convert non-uniform rotational motion into uniform rotational motion and vice versa. A motion conversion mechanism includes a housing, a common shaft, a symmetrical differential reduction gear, rings for differential power flows, cams having an inner working surface, cams having an outer working surface, and sliders with fingers. The inner working surface cam profile is described by the polar radius as a function of the polar angle and is an equidistant curve distanced outwardly from a first-order derivative of a basic closed curve by the size of the finger's radius. The outer working surface cam profile is described by the polar radius as a function of the polar angle and is an equidistant curve distanced outwardly from a second-order derivative of a basic closed curve by the size of the finger's radius. In a single revolution of the shaft, each ring performs two half revolutions back and forth.

1 Claim, 16 Drawing Sheets multiplicity - 2 multiplicity - 4 multiplicity - N basic curve first order derivative second order derivative

Left side

Right side

MOTION CONVERSION MECHANISM

This application is the national phase of PCT/RU2019/000235 filed on Apr. 10, 2019, which designated the U.S. and claims priority to RU 2018105758 filed on Feb. 15, 2018. The entire contents of each of which is hereby incorporated by reference herein.

FIELD OF THE INVENTION

This invention relates to the field of engineering, in particular, it concerns devices for conversion of non-uniform rotary movement into uniform rotary movement and vice versa.

BACKGROUND

Prior art includes the mechanism for transformation movement, RU 2374526, F16H 25/04 (2006.01), wherein rhomb-shaped pivoted four-bar motion with pins interacting with cams and slide-rails has been disclosed.

There is known rotary-vane engine with Kauertz connection mechanism containing mechanism of vanes connection made as a main revolving mechanism connected with rotary axis of rotors by gear (U.S. Pat. No. 3,144,007, Aug. 11, 1964).

Common deficiencies of such mechanism include significant loads on construction components due to conversion of movement through the single-loop power flows, impossibility to secure full blocking of one of power flows during calculated part of period upon simultaneous pure conversion of second power flow and relatively small efficiency of such mechanism caused thereby, in conjunction with availability of parasite load from one of the power flows, opposed to useful load taken off the second power flow.

There is also a mechanism for movement conversion which is the closest to the subject technical solution and which is used in rotary vane internal combustion engine, RU 2225513, F01C 1/077 (2000.01), wherein doubled maltese mechanism is used, and wherein one cross is rotated relatively to another to a half of angle of maltese cross, and differential converts rotary-intermittent movement of working shafts into rotation of engine outcome shaft with constant angle velocity.

This mechanism allows to provide full alternate blocking of one of power flows upon simultaneous pure conversion of second power flow.

Deficiency of this device is the lack of smoothness of movement conversion and bigger impact loads in the moment of stopping maltese cross mechanism.

SUMMARY OF THE INVENTION

The aim of the invention and technical result thereof is to achieve the smoothness of the movement conversion, enhancing of efficiency and reliability of the mechanism.

This aim is achieved by providing a mechanism containing a housing, a common shaft, a symmetric differential reductor, 2 loops of differentiated power flows, 2 cams with internal working surface mounted on loops of differentiated power flows, 2 cams with external working surfaces mounted on common shaft, 2 sliders with pins mounted on slide-rails mounted on the housing; main loading in the field of power flow conversion lies on symmetric differential reductor, and other components of mechanism take the loading on power flow conversion partially, provide smoothness of movement conversion, with the possibility of division of periods of pure conversion of one of the power flows upon full blocking of other power flow during calculated parts of full rotation of common shaft, preserving that one full rotation of common shaft corresponds to one full rotation of loops.

BRIEF DESCRIPTION OF THE DRAWINGS

The essence of the invention has been explained by drawings showing the following.

DETAILED DESCRIPTION OF THE INVENTION

Explanatory materials and drawings of the invention do not cover or limit the scope of claims for the subject technical solution but rather illustrates exemplary embodiment thereof.

Figure 1:
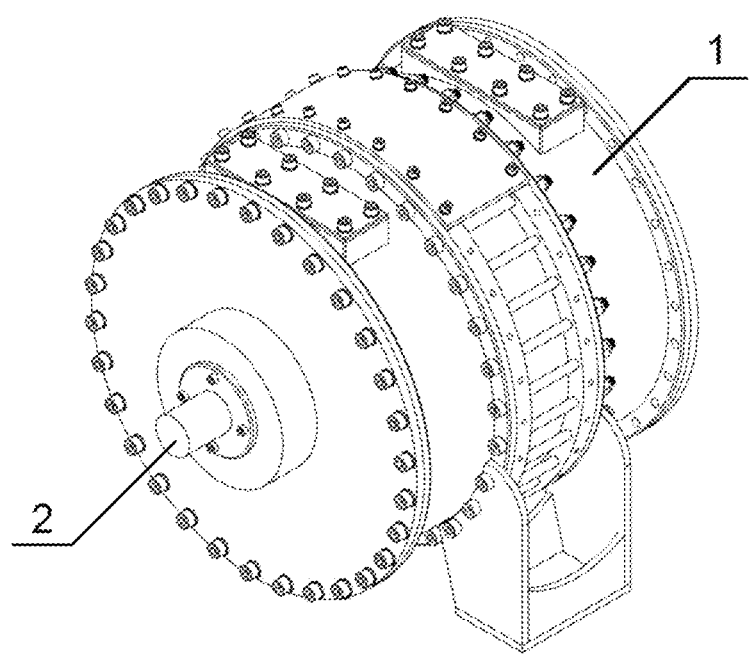
FIG. 1 shows general (isometric) view of mechanism for transformation movement.

The proposed mechanism (FIG. 1) contains the housing 1, in which the common shaft 2 is mounted rotatably.

Figure 2:
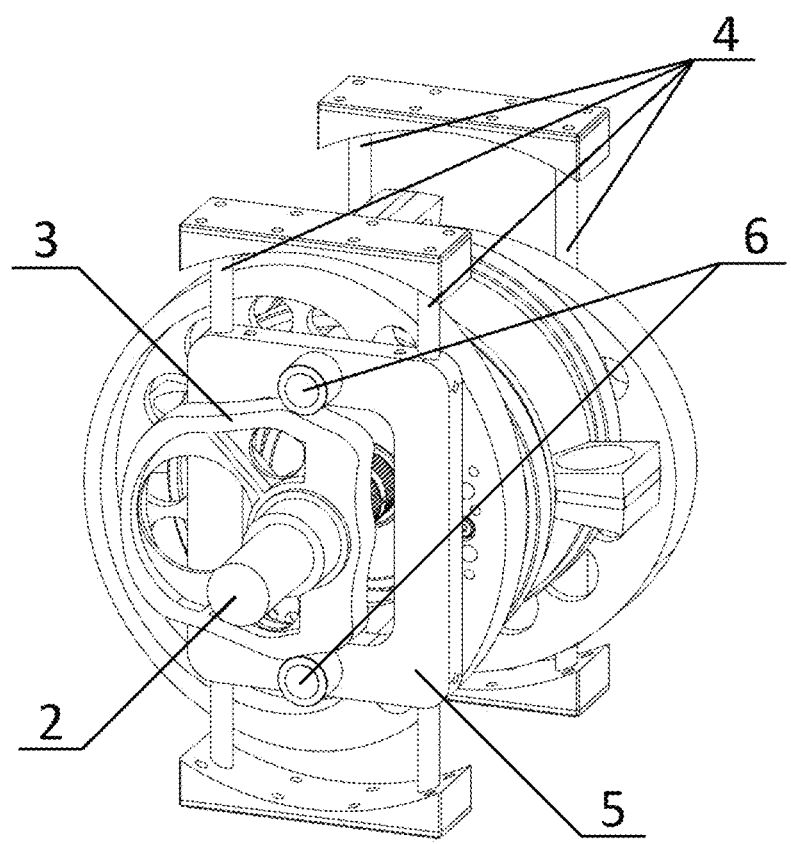
FIG. 2 shows general (isometric) view of the mechanism without the housing.

The cams with the outer working surface 3 are rigidly fixed on the shaft 2 (FIG. 2). The slide-rails 4 are fixed in the housing. The sliders 5 with the pins 6, freely move on the slide-rails 4.

Figure 3:
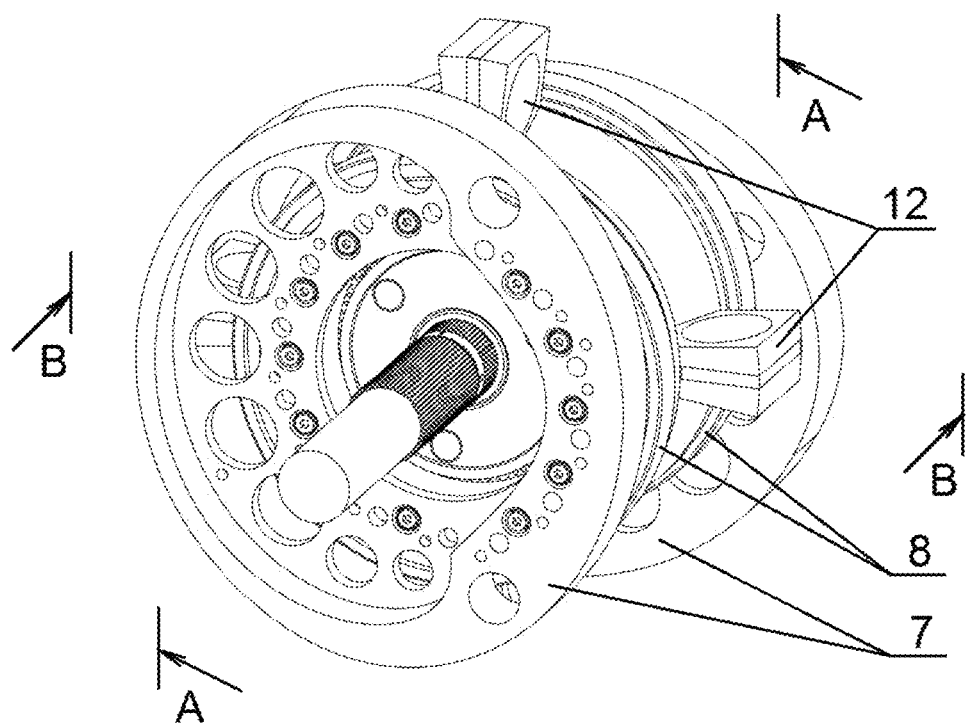
FIG. 3 shows isometric view of mechanism without housing, cams with external working surface and sliders with pins.
Figure 4:
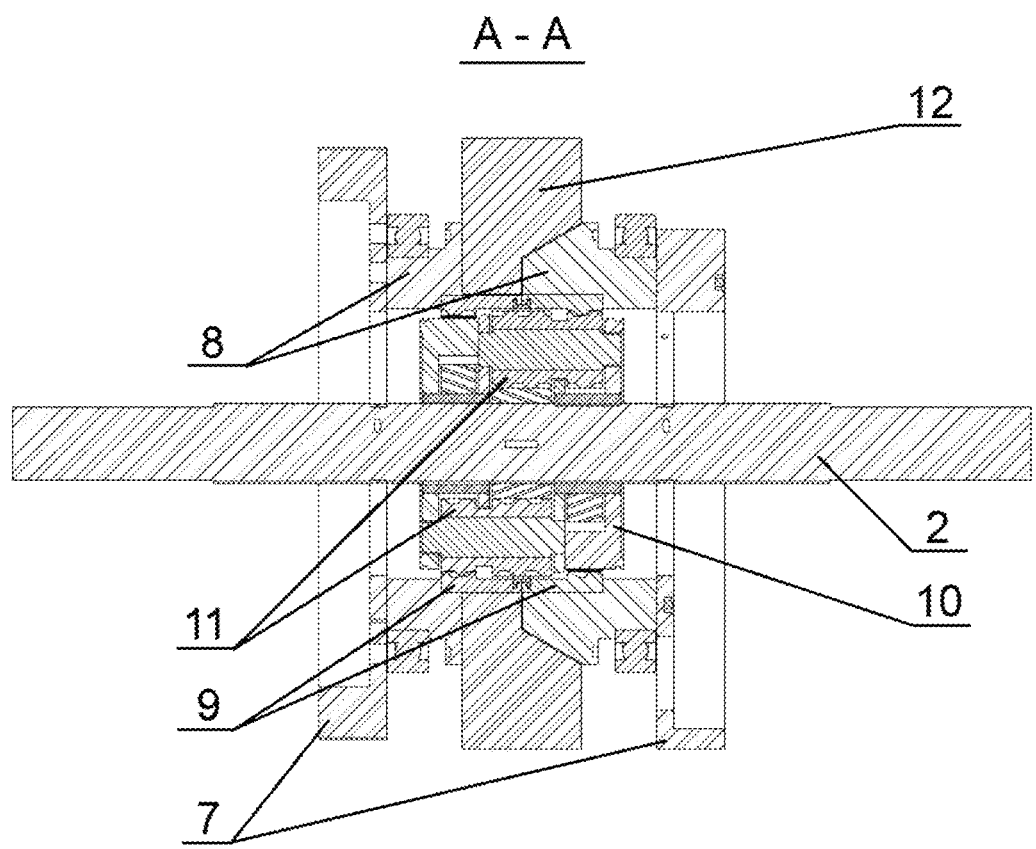
FIG. 4 shows FIG. 3 in A-A section.

The cams with an internal working surface 7 (FIG. 3) are installed on the rings of the differentiated power flows 8.

The rings of the differentiated power flows 8 are rigidly connected to the ring gears 9 of the symmetrical differential reduction gear, which is concentrically and rigidly fixed on the common shaft 2 through carrier 10.

The symmetrical differential reduction gear, in this case, is an epicyclic gear-train reducer (also known as planet gear) in which the differentiated power flows are transmitted from each side through symmetrical ring gears 9 to symmetric satellite gears 11, three per each side for its power flow. The satellite gears of different power flow are connected in pairs through the external gearing and fixed to the axes which are fixed to the single carrier 10 from which the total power flow is transmitted to the common shaft 2.

Figure 6:
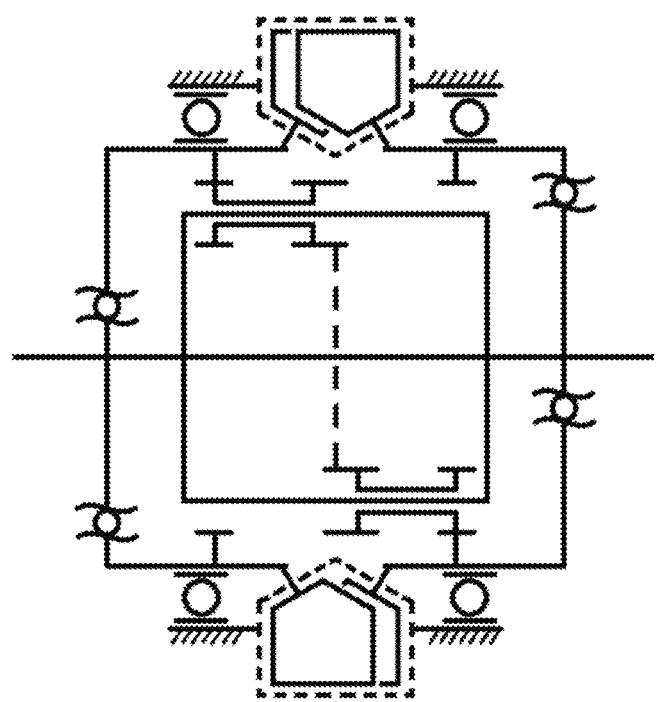
FIG. 6 shows kinematic scheme of mechanism.

The kinematic diagram of the mechanism for the motion transformation is shown in FIG. 6.

In the primary embodiment cams with the outer working surface 3 are arranged at an angle of 90 degrees relative to each other. The two pins 6 are located on both sides of the cams working surfaces in a vertical plane. In its turn, the pins contact radially with the working surfaces of the cams with an inner working surface 7.

In the proposed embodiment, the mechanism for the motion converting is made with possibility of the two-fold alternate blocking of each of the power flows per one turn of the common shaft, while the second power flow is simultaneously cleanly convert by ensuring a stable position of the elements to be stopped relative to the housing of the mechanism. One complete turn of the each ring occurs per one complete turn of the common shaft.

The execution of this algorithm is provided by the shape of the equidistant curves determining the cams profiles.

The equidistant curves determining the cams profiles with an internal working surface, is formed by the first order derivative of basic closed curve, and an equidistant determining the cams profiles with the outer working surface is formed by the second order derivative of basic closed curve.

The simplest basic closed curve is described by the dependence of the polar radius on the polar angle provided that it is ensured the smoothest variation of the polar radius and the condition under which the tangent to the base curve at the point of maximum polar radius coincides with the tangent to the circle with the same polar radius and the tangent to the base curve at the point of the minimum polar radius coincides with the absolute minimum polar radius.

An equation for such curve shall be described by formula:

$$\rho(\alpha) = \rho_{min} + \sqrt{\left(1 - \frac{(\alpha_{max} - \alpha)^2}{(\Delta\alpha)^2}\right) \times \Delta\rho^2}, \quad [1]$$

wherein $\rho(\alpha)$ is the polar radius;
$\rho_{min}$ is the pre-defined minimal polar radius;
$\Delta\rho$ is the pre-defined range of variation of polar radius;
$\alpha=0 \ldots 360$ is polar angle;
$\alpha_{max}$ is the pre-defined polar angle for maximum polar radius;
$\Delta\alpha$—is the pre-defined range of variation of polar angle, upon which polar radius might be changed once within the range between minimum and maximum value.

The simplest basic closed curve can also be useful for reflection the dependence of the angular velocity W variation of the rings of differentiated power flows on their rotation angle relative to the initial position.

Figure 7:
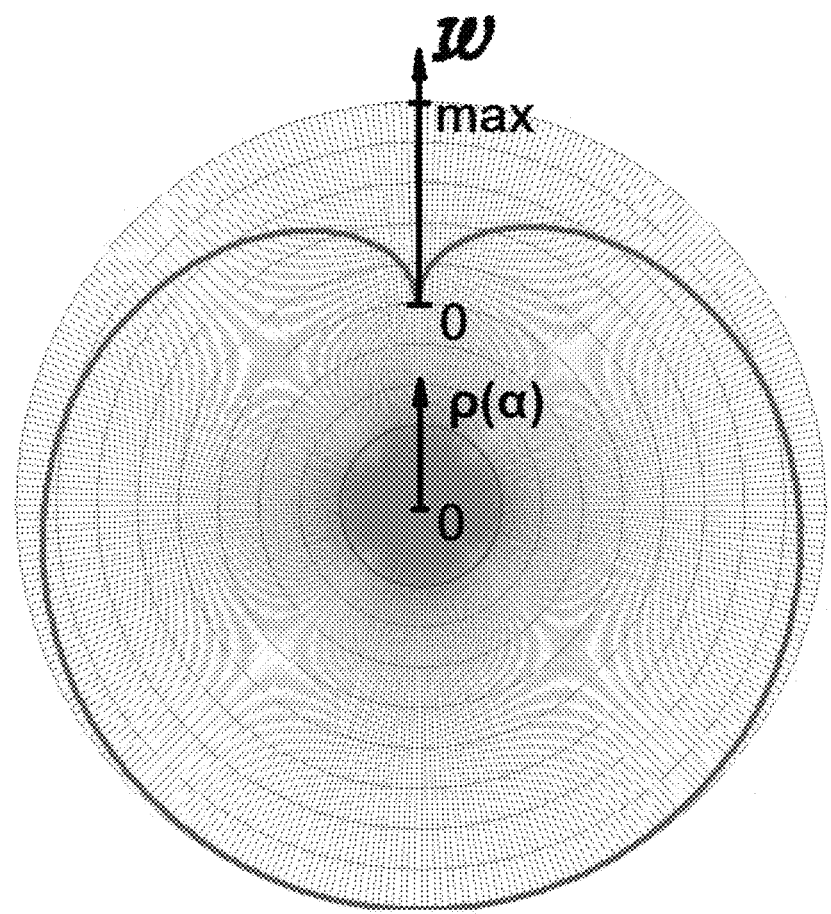
FIG. 7 shows the simplest base curve.

Using the shape of the simplest basic closed curve shown in FIG. 7, for obtaining the equidistants defining the profile of the cams, the motion conversion mechanism assembled with these cams will make it possible to perform one alternate interrupt of each of the power flows per one turn of the common shaft. In this case, the stopped flow is not delayed at a position at which its angular velocity W is zero, and immediately after stopping a new acceleration begins.

Figure 8:
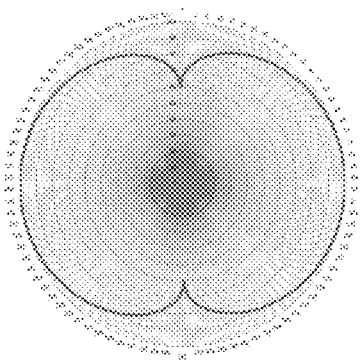
FIGS. 8, 9, 10 show examples of base curves with different rate (2, 4, N) of flow stops.
Figure 9:
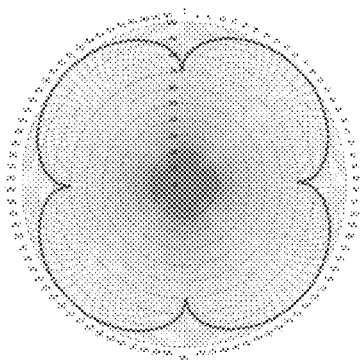
Figure 10:
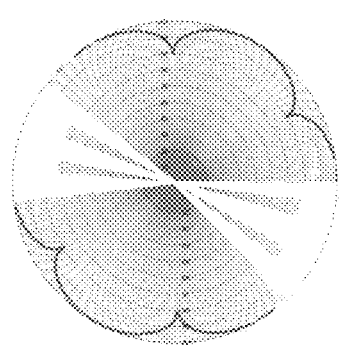

For obtaining the equidistant curves determining the profile of the cams with the possibility realizing repeated alternate interruption of each of the flows per one turn of the common shaft, formulas for calculation the base curves should be applied in a similar way, but with division into a number of periods in accordance to the required interruption multiplicity of each of the flows. An example of the shapes of such curves with the multiplicity characteristics of periods 2, 4, and N is shown in FIG. 8, FIG. 9 and FIG. 10.

For obtaining the equidistant curves determining the profile of the cams, which provide the possibility of alternately interruption each of the flows per the required period of time, it is necessary to include in the basic closed curve the corresponding segments with a constant polar radius. These segments divide the base curve at its points with the maximum polar radius.

The segments length with a constant maximum polar radius characterizes the duration of the pure conversion periods of one of the power flow when the another power flow is completely blocked and can be adjusted to optimize the duration of the acceleration-stop periods and, accordingly, to minimize residual inertia forces and parasitic loads on the mechanism.

Figure 11:
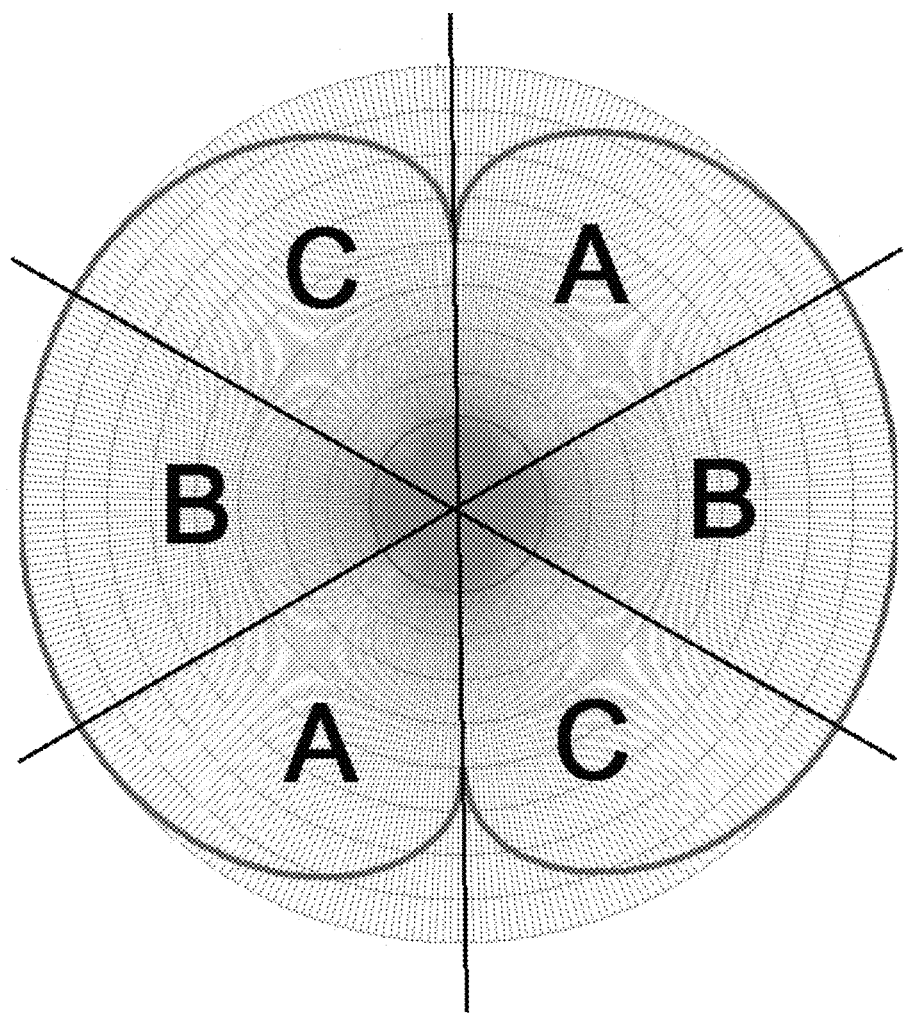
FIG. 11 shows base curve applicable in the proposed mechanism.

In order to obtain the equidistant curves applicable to the presented technical solution of the motion transformation mechanism, with the possibility realizing two-fold alternate long stop of each power flow per one turn of the common shaft, the formula for base curve will look as follows:

for sections A and C (FIG. 11)—as in formula for simplest base curve:

$$\rho(\alpha) = \rho_{min} + \sqrt{\left(1 - \frac{(\alpha_{max} - \alpha)^2}{(\Delta\alpha)^2}\right) \times \Delta\rho^2}, \quad [2]$$

for sections B:

$\rho(\alpha)=\rho_{max}$, where $\rho_{max}$ is maximum polar radius.

The condition of applicability to the mechanism for the motion transformation with a symmetrical differential reduction gear is compliance with the requirement of symmetry of the same name sections of the curve relative to the center of the circle, as well as sections A with sections C relative to the line of the minimum polar radius.

Figure 12:
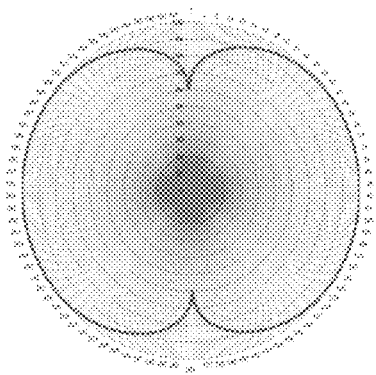
FIG. 12, 13 14 show base curve with first-order derivative and second-order derivative.
Figure 13:
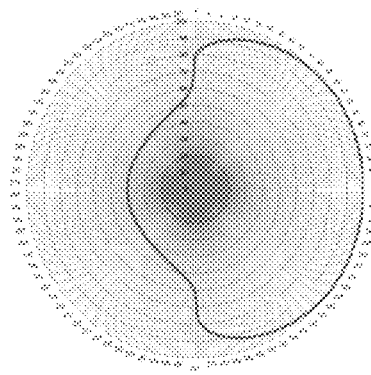
Figure 14:
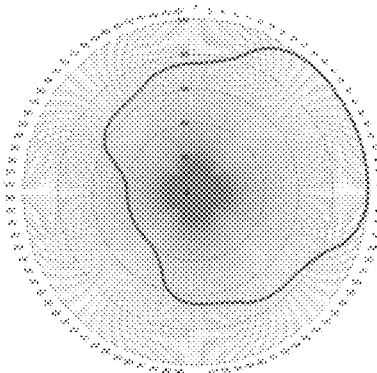

It is necessary to consider obtaining of first order derivative and second order derivative (FIGS. 12, 13, 14) from base closed curve, in order to obtain the proposed embodiment of mechanism for the conversion of motion.

For obtaining of profile of the cam with internal working surface it is necessary to build first order derivative $\rho_1(\alpha)$ from base closed curve.

Figure 15:
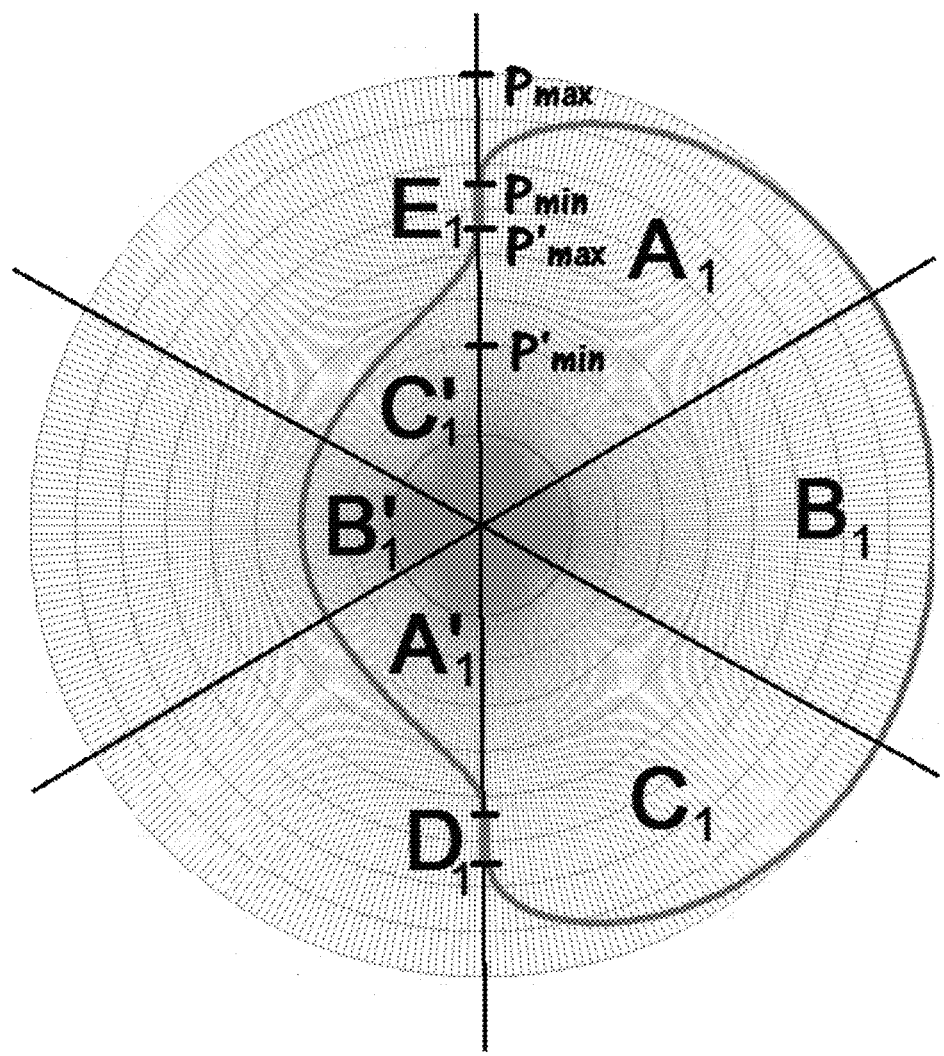
FIG. 15 shows first-order derivative curve.

For sections $A_1$, $B_1$ and $C_1$ (FIG. 15) those formulas for calculation of curve that are identical with formulas of calculation of base curve are adopted. For sections $A_1$ и $C_1$:

$$\rho_1(\alpha) = \rho_{min} + \sqrt{\left(1 - \frac{(\alpha_{max} - \alpha)^2}{(\Delta\alpha)^2}\right) \times \Delta\rho^2}, \quad [3]$$

for section $B_1$:

$\rho_1(\alpha)=\rho_{max}$, and for sections $A_1'$ и $C_1'$ equation shall be:

$$\rho_1'(\alpha) = \rho_{max}' - \sqrt{\left(1 - \frac{(\alpha_{min} - \alpha)^2}{(\Delta\alpha)^2}\right) \times (\Delta\rho')^2}, \quad [4]$$

where $\rho'_1(\alpha)$ is the polar radius of the first-order derivative of the base curve for calculated sections;
$\rho'_{max}$ is the definable value of maximum polar radius for calculated sections;

$\Delta\rho'$ is the definable range of variation of values of the polar radius within the ranges of calculated sections;

$\alpha=0 \ldots 360$ is the polar angle;

$\alpha_{min}$ is the definable value of the polar angle for the polar radius with minimum value on calculated section;

$\Delta\alpha$ is definable range of variation of polar angle upon which the polar radius changes once within the ranges between minimum and maximum value on calculated section.

For section B'$_1$ formula shall be:

$$\rho'_1(\alpha)=\rho'_{min},$$

where $\rho'_{min}$ is the definable value of the minimum polar radius for calculated section.

Meanwhile, it is possible to introduce the segments $D_1$ and $E_1$ of equal length breaking sections $A_1$ and $C'_1$, as well as $A'_1$ and $C_1$ into first order derivative from base closed curve, for providing the movement of pin throughout working surface of the cam in the moment of blocking of power flow for rearrangement of load upon the period of such blocking on working surface of cam and removal of potential cold work hardening effect. Sections $D_1$ and $E_1$ shall lie along polar radiuses and connect ends of sections $A_1$ и $C'_1$, as well as of $A'_1$ и $C_1$.

Meanwhile, the following conditions of equality shall be provided:

angular length of section: $A_1=A'_1$, $B_1=B'_1$ and $C_1=C'_1$;

$\Delta\rho'=\Delta\rho$.

Figure 16:
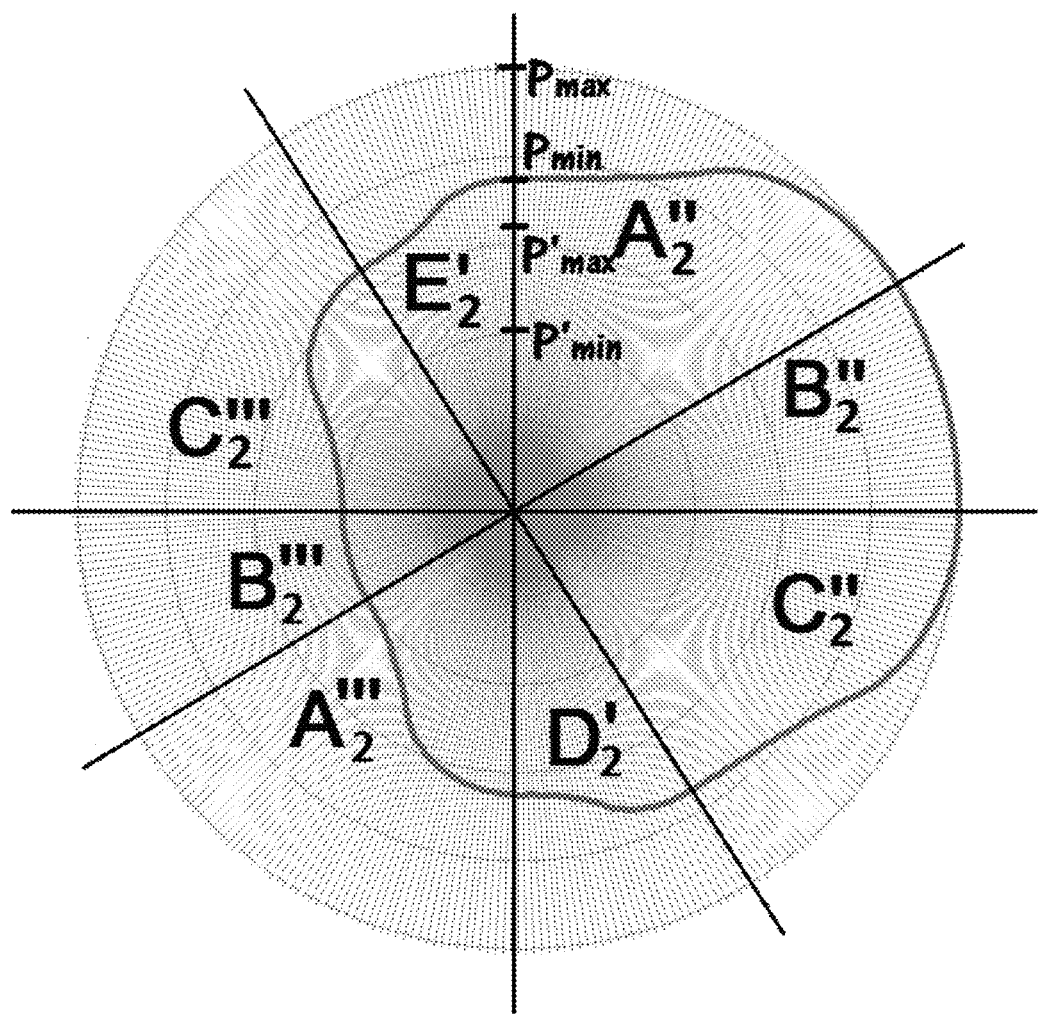
FIG. 16 shows second-order derivative curve.

For obtaining of the cams profile with external working surface it is necessary to build the second-order derivative $\rho_2(\alpha)$ (FIG. 16) of base closed curve.

For segments D and E introduced into first order derivative from base closed curve it is necessary to define on second-order derivative the sections with angular length which is equivalent with required relative length of blockage of integrated power flows.

Meanwhile, it is necessary to take into account that for efficiency of mechanism, including compatibility with characteristics of symmetrical differential redactor, angle length of sections shall be compliant with equations:

$$A''_2=A'''_2=C''_2=C'''_2$$

$$B''_2=B'''_2=D'_2=E'_2$$

Values of minimum and maximum polar radius in start and finish points of sections of second derivative of base curve shall be equivalent to polar radiuses of start and finish points in corresponding sections of first derivative of base curve.

In addition, the angular lengths of the variable polar radius sections on the second derivative of the base curve should be equal to the angular lengths of the corresponding sections with variable polar radius on the first derivative of the base curve.

In further calculations all sections except B''$_2$ и B'''$_2$ are divided by medium polar angle $\alpha_{mid}$ for two parts [$\alpha_{min}-\alpha_{mid}$] and [$\alpha_{mid}-\alpha_{max}$] with equal angle length, where $$\alpha_{mid} = \frac{|\alpha_{max} - \alpha_{min}|}{2}.$$

For sections A''$_2$ and C''$_2$ on segments between $\alpha_{min}$ and $\alpha_{mid}$ formula becomes:

$$\rho''_2(\alpha) = \rho(\alpha)_{max} - \sqrt{\left(1 - \frac{(\alpha_{min} - \alpha)^2 \times 3}{(\Delta\alpha)^2}\right) \times (\Delta\rho(\alpha))^2}, \quad [5]$$

and on segments in ranges between $\alpha_{max}$ and $\alpha_{mid}$:

$$\rho''_2(\alpha) = \rho(\alpha)_{min} + \sqrt{\left(1 - \frac{(\alpha_{max} - \alpha)^2 \times 3}{(\Delta\alpha)^2}\right) \times (\Delta\rho(\alpha))^2}, \quad [6]$$

where $\rho''_2$ is polar radius of second-order derivative;

$\rho(\alpha)_{max}$ is the pre-defined value of maximum polar radius for calculated sections;

$\rho(\alpha)_{min}$ is the pre-defined value of minimum polar radius for calculated sections;

$\Delta\rho(\alpha)$ is the defined range of variation of values of polar radius for calculated sections;

$\alpha=0 \ldots 360$ is the polar angle;

$\alpha_{min}$ is the pre-defined value of polar angle for polar radius with minimum value for calculated sections;

$\alpha_{max}$ is the pre-defined value of polar angle for polar radius with maximum value for calculated sections;

$\Delta\alpha$ is the definable range of change of polar angle, upon which polar radius changes once within the ranges between minimum and maximum value in the calculated period.

For sections A'''$_2$ and C'''$_2$ on segments between $\alpha_{max}$ and $\alpha_{mid}$ formula becomes:

$$\rho''(\alpha) = \rho'(\alpha)_{min} + \sqrt{\left(1 - \frac{(\alpha_{min} - \alpha)^2 \times 3}{(\Delta\alpha)^2}\right) \times (\Delta\rho'(\alpha))^2}, \quad [7]$$

and on segments in ranges between $\alpha_{min}$ and $\alpha_{mid}$:

$$\rho''(\alpha) = \rho'(\alpha)_{max} - \sqrt{\left(1 - \frac{(\alpha_{max} - \alpha)^2 \times 3}{(\Delta\alpha)^2}\right) \times (\Delta\rho'(\alpha))^2}, \quad [8]$$

For sections D'$_2$ and E'$_2$ on segments between $\alpha_{max}$ and $\alpha_{mid}$ formula becomes:

$$\rho''(\alpha) = \rho(\alpha)_{min} - \sqrt{\left(1 - \frac{(\alpha_{min} - \alpha)^2 \times 3}{(\Delta\alpha)^2}\right) \times (\Delta\rho'(\alpha))^2}, \quad [9]$$

and on segments in ranges between $\alpha_{min}$ and $\alpha_{mid}$:

$$\rho''(\alpha) = \rho'(\alpha)_{max} + \sqrt{\left(1 - \frac{(\alpha_{max} - \alpha)^2 \times 3}{(\Delta\alpha)^2}\right) \times (\Delta\rho'(\alpha))^2}. \quad [10]$$

For section B''$_2$ formula becomes:

$$\rho''(\alpha)=\rho(\alpha)_{max}.$$

For section B'''$_2$ formula becomes:

$$\rho''(\alpha)=\rho''(\alpha)_{min}.$$

Figure 5:
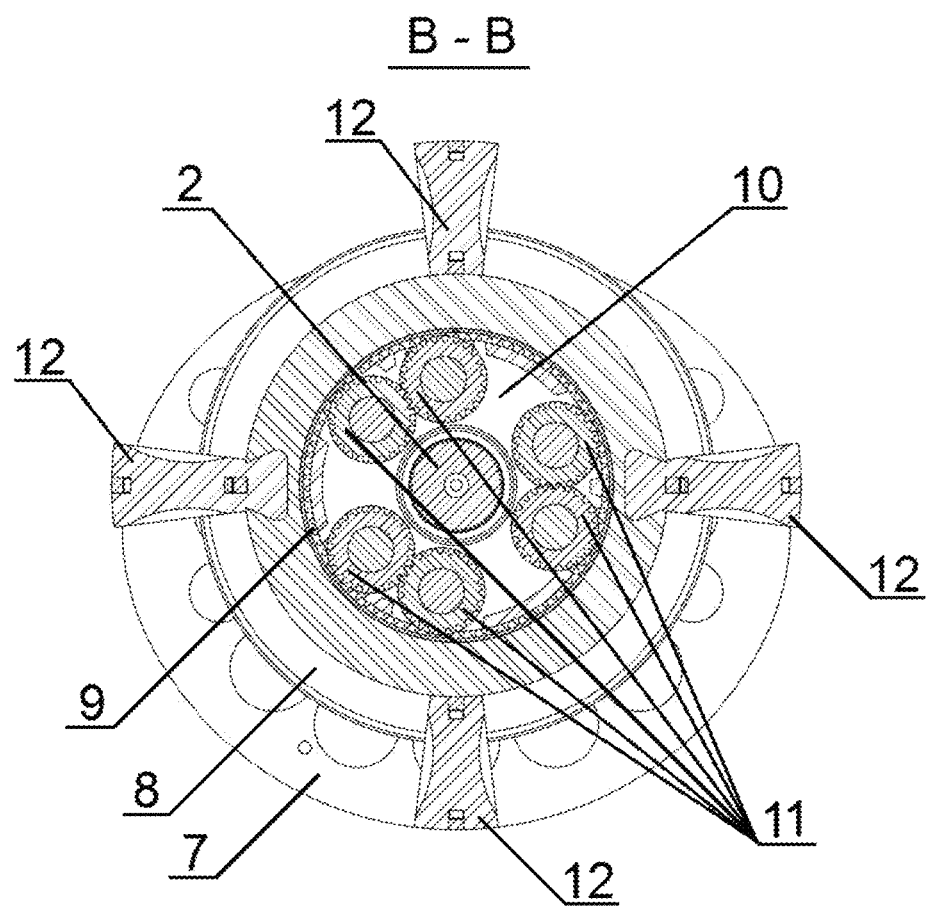
FIG. 5 shows FIG. 3 in B-B section.

For simplicity of description of the operation principle of the mechanism of the transformation of motion, we will present it as a part of a rotary-vane internal combustion engine, in which two pistons 12 are located on the power flows rings in diametrically opposite positions (FIG. 5). Lines passing through the centers of diametrically opposite pistons are perpendicular to the axes of symmetry of the cams with an internal working surface on each side.

In addition, for simplicity of description, we assign the following names: for a cam with an internal working surface—"ear", for a cam with an external working surface—"cheek". Different sides of the effect of power flows are denoted as "right" and "left".

We take the name of the areas of the working surfaces of the ears and cheeks in accordance with the designation of analogous sections of the curves-derivatives of the base closed curve.

Figure 17:
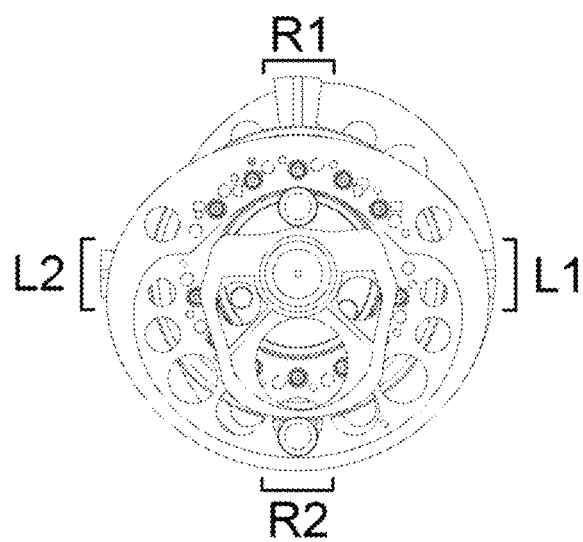
FIGS. 17 and 18 shows initial positions of mechanism components leftside and rightside consequently.
Figure 18:
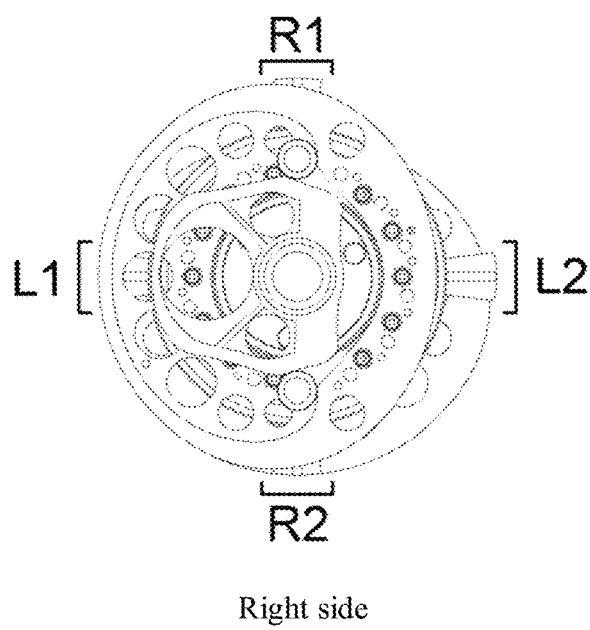

The mechanism operates in the following way: as the initial position of the elements it is accepted a state in which the axes of symmetry of the ears of the right and left sides are perpendicular to each other wherein the symmetry axes of the cheeks are also perpendicular to each other, while the cheeks in the middle of their working surfaces B"$_2$ as well as the middle of the working surfaces B$_1$ of the ears (FIGS. 17 and 18).

The initial position for the side of the stopped power flow is that side where the slider 5 (FIG. 2) is in concentricity position with the common shaft 2 and its pins 6 are in the middle of the ear surfaces D$_1$ and E$_1$ and the cheek surfaces D'$_2$ and E'$_2$. The pistons of this side are in the original locked state, respectively. This side is called right (FIG. 18). On the left side, the pins of the slider contact the working surfaces of the ear and cheek, by the surfaces of the surfaces B$_1$, B'$_1$, and B"$_2$, B'''$_2$, respectively. The left side pistons are in the middle of their working stroke in this case.

The rotation of the ring 9 on the left side caused by the action of the expanding gases on the piston L1 (FIGS. 17 and 18) lead to the rotation of the common shaft by means of kinematic connections in the gearbox. At the same time, the exhaust stroke occurs between the pistons L1 and R2, an intake stroke occurs between the pistons R2 and L2, and a compression stroke occurs between the pistons L2 and R1.

In view of the fact that the right side pistons are blocked, a pure conversion of the power flow by the gearbox occurs right up to the moment when the left ear and cheek simultaneously reach the pins location by the start points of the sections A$_1$ and A"$_2$. At the same time the right cheek reaches the pins location by the start points of the sections C"$_2$ and C'''$_2$.

When the left ear sections A$_1$ rolls on the pin, the pin shifts in the direction of the axis of the common shaft and, accordingly, the force is transferred through the slider and the paired pin to the section A"$_2$ of the working surface of the left cheek. Thus, an additional torque is created on the left cheek and through the common shaft on the right cheek, accordingly. Because of this, the right cheek with the working surface section C"$_2$ rolls on the pin, the pin moves away from the axis of the common shaft and, accordingly, the force transfer through the slider and the paired pin to the working surface section C$_1$ of the right cheek. An additional torque appears on the right cheek. An acceleration of rotating of the ring 9 fixed to the right cheek with the pistons 12 is occurred.

Figure 19:
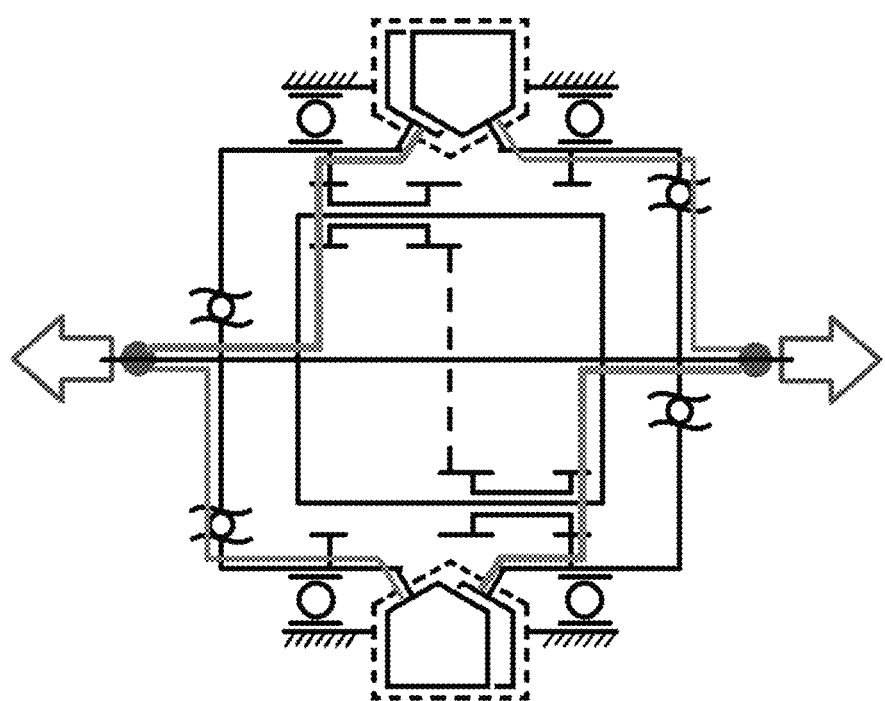
FIG. 19 shows the scheme of power flows.

The torque transfer from the left to the right side occurs by way: the left ear-the pins on the slider-the left cheek-the common shaft-the right cheek-the pins on the slider-the right ear, as well as through the reducing gear train (FIG. 19).

The deceleration of the ring gear on one side of the symmetrical differential reduction gear through the kinematic links causes the acceleration of rotating of the ring gear on the other side.

Thus, the resistance from overcoming the rest energy of the elements of the right side, and resistance from the action of the combination of forces of engine working processes on the pistons L1 and L2, led to the counter force appearance and to decelerating left ear as a result of rolling on the roller. The right ear, in turn, is rotate with acceleration caused by both the kinematic influence on it through the mechanism of transformation and the subsequent pressure of expanding working gases on the piston R1.

A uniform symmetric-antagonistic change of the magnitude and the direction of the velocity vectors of the rings 9 with pistons 12 controlled by the equidistant curve profile occurs until the slowing elements are completely stopped and the full rotary acceleration of the elements accelerated.

Figure 20:
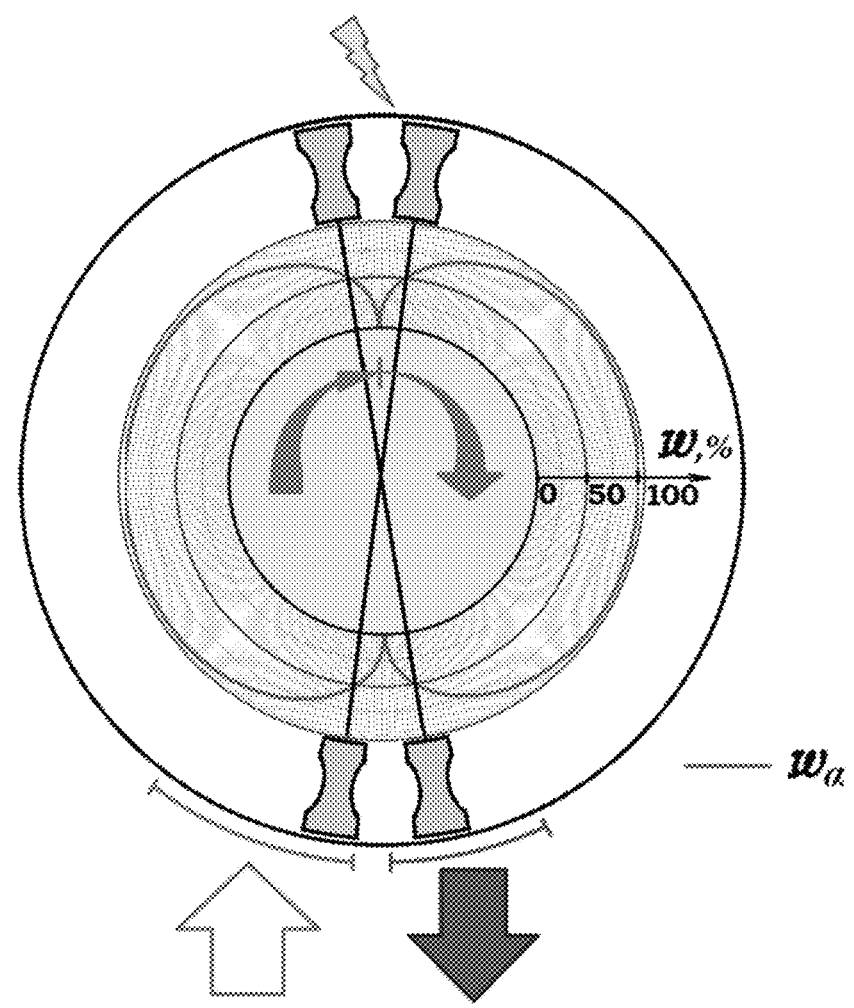
FIG. 20 shows schematic representation of equal velocities on basis of graph of variation of angular velocity as a base curve.

In this case, the maximum coming closer together of slowing and accelerating pistons occurs at a moment when their speeds are equalized, and their positions are equidistant from the stopping point. Schematically, this moment is displayed using the angular velocity variation curve as a base curve in FIG. 20.

Further work of the mechanism occurs in the same sequence alternately for each side. The two half-turns of the rings in the shuttle mode occur per one revolution of the common shaft.

Variable power flows transmitted from both sides are integrated into a uniform power flow on the common shaft.

In reverse mode, the motion conversion mechanism can be used to differentiate the power flow from the common shaft to two flows, for example, as part of a compressor.

Upon use of the motion conversion mechanism for work as a part of a rotary-vane internal combustion engine, based on calculating the inertia forces and the forces acting on the pistons from the engine working processes, it is necessary to select the optimal ratio of the sections A(C) and B of the base curve to minimize the periods of parasitic forces appearance.

Upon use of the motion conversion mechanism for work as a part of the compressor to increase the smoothness of the mechanism, the section B of the base curve can be minimized.

The invention claimed is:

1. A machine for transforming movement, comprising:
   a housing,
   a common shaft,
   a symmetric differential reductor,
   two loops of differentiated power flows,
   two cams with an internal working surface mounted coaxially to the common shaft,
   two cams with external working surfaces mounted coaxially on the common shaft,
   two sliders with pins, mounted on slide-rails mounted on the housing,
   wherein a profile of the cams with the inner working surface is determined by a dependence of a polar radius as a function of a polar angle and represents an equidistant, spaced by a finger radius outward from the first-order derivative of a basic closed curve, and a profile of the cams with the outer working surface is determined by a dependence of the polar radius as a function of the polar angle and is an equidistant, spaced by the finger radius inward from the second-order derivative of the basic closed curve, while the basic closed curve is described by the following formula:

$$\rho(\alpha) = \rho_{min} + \sqrt{\left(1 - \frac{(\alpha_{max} - \alpha)^2}{(\Delta\alpha)^2}\right) \times \Delta\rho^2} \, ,$$

wherein ρ(α) is the polar radius;
$\rho_{min}$ is a pre-defined minimal polar radius;
Δρ is a pre-defined range of variation of the polar radius;
α=0 . . . 360 is the polar angle;
$\alpha_{max}$ is a pre-defined polar angle for maximal polar radius; and
Δα is a pre-defined range of variation of the polar angle, upon which the polar radius may be changed once within a range between the minimal and maximal polar radius.

* * * * *